United States Patent [19]
Vossen

[11] 3,879,252

[45] Apr. 22, 1975

[54] APPARATUS FOR APPLYING REINFORCING SLEEVE

[75] Inventor: Werner Vossen, Neckarsteinach, Germany

[73] Assignee: Mannesmann Aktiengesellschaft, Dusseldorf, Germany

[22] Filed: Apr. 4, 1973

[21] Appl. No.: 347,543

[52] U.S. Cl. ............... 156/423; 156/381; 156/499; 156/294; 214/18 R; 432/224; 29/235
[51] Int. Cl. ............................................ B29d 3/00
[58] Field of Search ........... 156/294, 381, 423, 499, 156/69, 391; 422/121; 214/18 R, 23; 264/230, 248, 269; 29/234, 235; 93/36.01; 432/224–227; 266/5 E, 5 EI

[56] References Cited
UNITED STATES PATENTS

| | | |
|---|---|---|
| 2,936,813 | 5/1960 | Haase .................................... 154/9 |
| 2,952,298 | 9/1960 | Hogendohler et al. ............... 154/41 |
| 3,035,958 | 5/1962 | Wilkins .............................. 156/294 |
| 3,709,643 | 1/1973 | Nasica ................................. 264/92 |

Primary Examiner—Charles E. Van Horn
Assistant Examiner—Neal Kalishman
Attorney, Agent, or Firm—Ralf H. Siegemund

[57] ABSTRACT

An apparatus for applying a sleeve to a tube includes a carriage movable on the axis of the tube, and has a pivotable receptacle serving as heating chamber for a sleeve. The receptacle receives the sleeve when in upright position, holds and heats it while a second receptacle heats the tube end. After heating, the two receptacles pivot and the sleeve is pushed onto the tube.

6 Claims, 3 Drawing Figures

APPARATUS FOR APPLYING REINFORCING SLEEVE

BACKGROUND OF THE INVENTION

The present invention relates to the art of applying a sleeve such as a thermoplastic sleeve to an end section of a tube for reinforcing that tube.

Various methods are known for providing thermoplastic ends with socket sleeves. The material employed here may be hard polyvinylchloride. Socket sleeves require the wall of the tube to be quite thick, particularly in those cases where the tube is to conduct a pressurized medium. Therefore, it is known to reinforce and strengthen the tube's wall by means of applying a reinforcing sleeve thereto; the sleeve is heated and slipped onto the heated tube. Subsequently, sleeve and tube end are formed into a socket.

The tube is usually heated in a heater or furnace provided for that purpose. The sleeve was likewise heated in a heater, such as a thermobox or the like, taken from there and brought to the tube for placement thereon. This method of heating and applying is not suitable for automated manufacture of tube or pipe connecting sleeves.

SUMMARY OF THE INVENTION

It is an object of the present invention to provide for equipment occupying limited space and usable in an automated production line for heating a sleeve and applying it onto a tube or pipe end.

In accordance with the preferred embodiment of the invention, it is suggested to provide a receptacle which receives the sleeve in its entirety; the receptacle is provided with or as a heating chamber for heating the sleeve when received. The receptacle is mounted in a carriage which can be moved in the horizontal, and the receptacle can turn on a horizontal axis in that carriage for placement into a coaxial position with respect to the tube to which the sleeve is to be applied. An ejection mechanism is provided in relation to the receptacle to push the heated sleeve from the receptacle onto the tube, which is maintained in centered position during the procedures.

As a further feature, the same carriage may support another heating receptacle, pivotable on the same axis as the first one and provided for heating the tube end prior to pushing the heated sleeve thereon. Preferably, the two receptacles are mounted to each other and at a 90° angle.

The equipment in accordance with the invention permits automated sequencing of heating tube end and sleeve and placing the former on the latter, all within a production line and as ready preparation for a subsequent socket and joint forming step. The combining of heatable receptacles for the tube and for the sleeve in a common frame and carriage permits concurrent heating without requiring additional space. The receptacles are provided with annular heating chambers matching the circularity of tube and sleeve. The heating receptacle for the sleeve is additionally provided with a supporting mandrel. The mandrel eliminates any deformation of the tube end just prior to placement of the sleeve thereon, so that the sleeve can readily be pushed onto the tube without encountering any impediment.

A feeder, store or the like is provided above the carriage for feeding the sleeves and placement thereof into the one heated receptacle. After pivoting by 90° the heated sleeve is aligned with the pipe and pushed thereon.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

Figure 1:
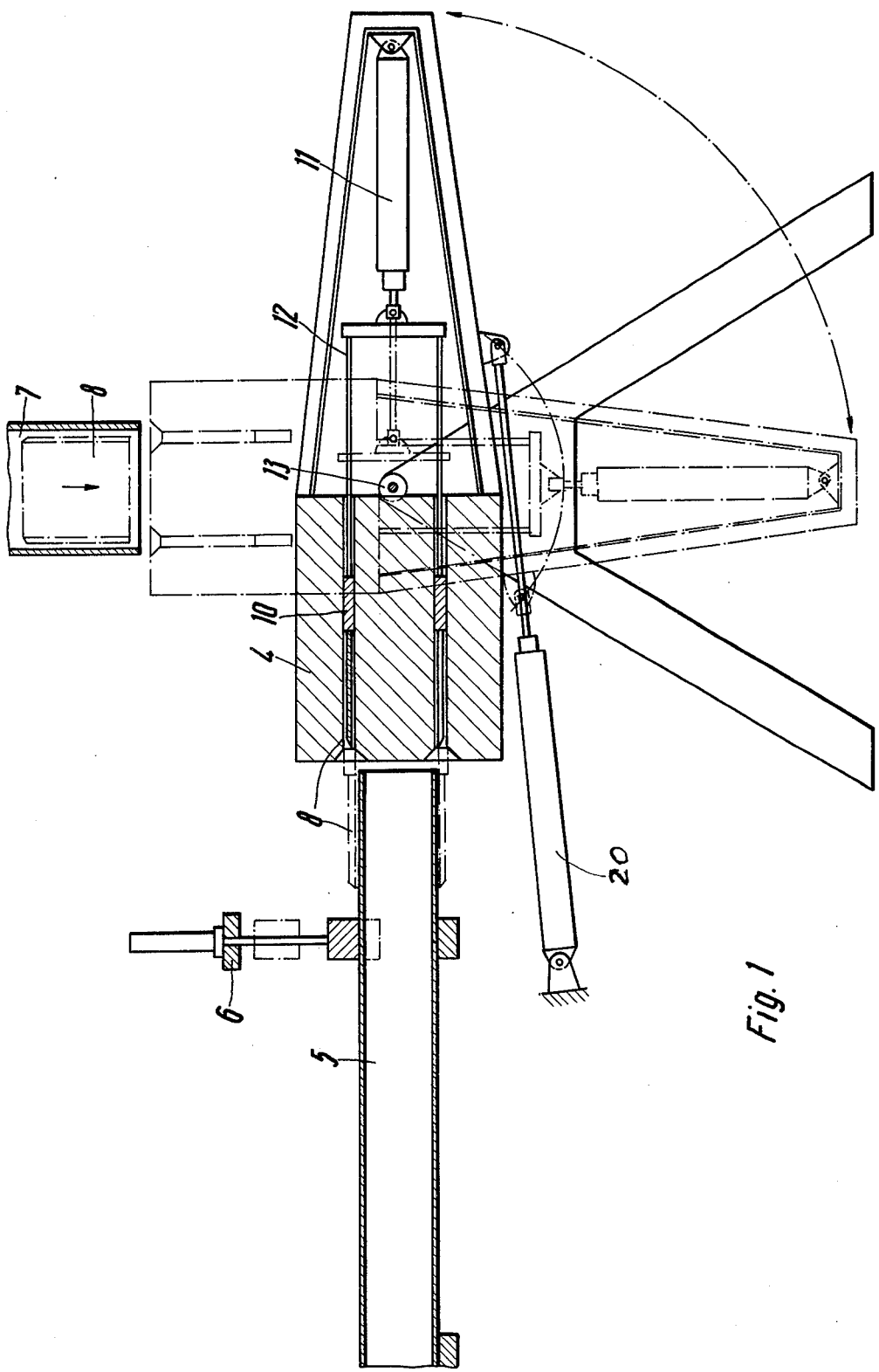
FIG. 1 is a somewhat schematic section view in accordance with the preferred embodiment of the present invention.

Proceeding now to the detailed description of the drawings, the figures show a stationary frame part 1 with rails for supporting movable frame part 2 constructed as a carriage to permit horizontal displacement. A heatable receptacle 4 is mounted on frame part 2 in a manner permitting pivoting on an axis 13. The dash-dot line with double arrow in FIG. 1 illustrates the range of pivoting needed. Reference numeral 20 denotes a hydraulic cylinder as actuator to pivot the receptacle 4 on axis 13.

The receptacle 4 is provided with or as annular heating chamber for heating a sleeve 8 and holding the sleeve when placed into coaxial alignment with a tube 5. The tube 5 (which is the second piece worked) is held in a device 6 adapted for centering the tube 5 into a coaxial disposition with a sleeve when held in receptacle 4 and when the receptacle has been pivoted into horizontal position.

The receptacle is in its rear provided with an ejector mechanism or arrangement which includes an annulus 10 in the sleeve, pushing rods 12 connected to the pushing annulus 10, and a hydraulic cylinder 10 for operating the rods 12 so as to displace the pushing annulus in the receptacle.

A storage and feeder facility 7 is provided on top of the arrangement as described thus far, for feeding sleeves 8 to the arrangement and placing them into the receptacle 4 when having upright disposition, shown in dash-dot phantom lines in FIG. 1. The carriage is movable in the direction of the axis of the tube 5, basically in between a position where the upright receptacle 4 is under store 7, and positions of particular relation of the tube and of the receptacle when having horizontal orientation.

Figure 2:
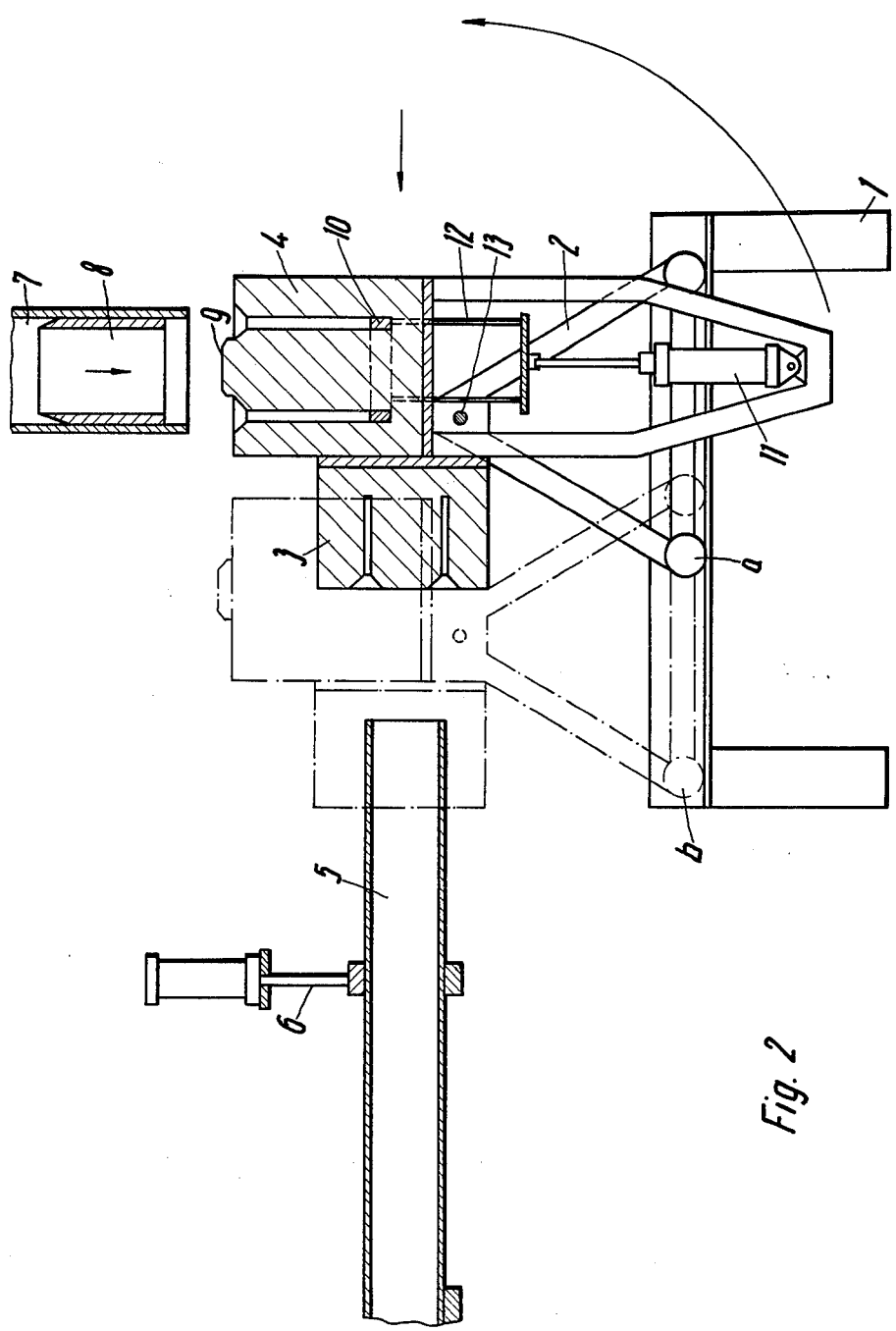
FIG. 2 shows the device as supplemented from two heating receptacles and in a disposition in one receptacle receives the sleeve.
Figure 3:
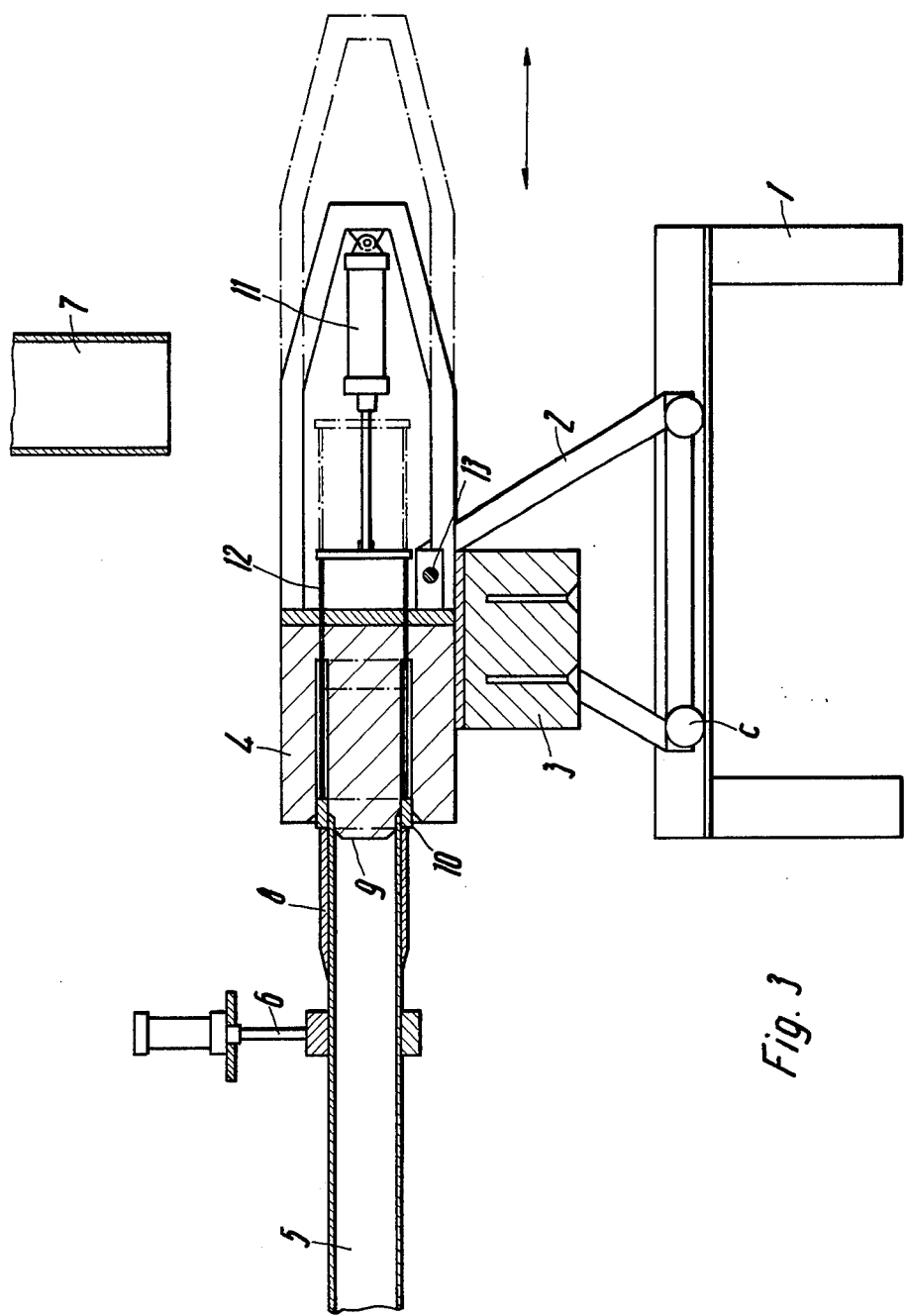
FIG. 3 shows the device in disposition for pushing the sleeve into a tube.

Omitted in FIG. 1 for the sake of clarity is another heating receptacle, indexed with reference numeral 3 in FIGS. 2 and 3 and mounted to receptacle 4 at right angles so that they pivot in unison. The two receptacles have annular receiving space for receiving, centering and heating any annulus that is received. The annular receiving spaces, however, differ, as receptacle 3 is provided to receive the end of a tube such as 5, while receptacle 4 receives the somewhat larger sleeves 8. A sleeve 8 is to be heated and later slipped onto a tube 5. As stated, both receptacles are provided with means for heating, such as ducts for a heating fluid; resistance coils for electric heating, etc. Receptacle 3 heats the end of a tube 5, receptacle 4 heats a sleeve 8.

The equipment as described works as follows: At first, the tube 5 is aligned with an indexing position which defines the axis of receptacle 4 when in a horizontal position, but which defines also the axis of the annular heating and receiving space in receptacle 3. The receptacles have disposition as shown in FIG. 2 wherein a sleeve 8 is released from store 7 and placed into receptacle 4. The frame (carriage) 2 has horizontal disposition that permits coaxial alignment of store 7 with the upright disposition of receptacle 4. This disposition of the carriage is denoted with reference character $a$ in FIG. 2.

Next, carriage 2 is moved on frame 1 in the direction of the horizontal arrow in FIG. 2 into position $b$ (dash-dot phantom lines) whereby the end of tube 5 is received in the annular heating chamber of receptacle 3. Heating of the tube end takes a particular period of time and, it should be noted, that the annular heating space of receptacle 3 permits uniform heating. During the same period (or during overlapping periods) sleeve 8 is heated in receptacle 4. As tube and sleeve are heated concurrently, uniformity of heating and metering of applied and effective heat as to both these work pieces permits optimum adjustment to the requirements for subsequently applying the heated sleeve onto the heated tube.

After heating, frame 2 moves back to a position $a$ and the receptacles are pivoted by 90°. Next, frame carriage 2 is advanced again to a position C (FIG. 3) wherein the tube 5 is aligned with sleeve 8 inside of receptacle 4, whereby the tube end faces the receptacle in juxtaposed position.

The inner core of the receptacle 4, which is surrounded by the sleeve 8, can also be termed a mandrel, and that mandrel has a projection 9 which projects slightly into tube 5 when the frame 2 has position C. This projection 9 eliminates any deformation at the axial end of tube 5.

Next, ejector arrangement 10-11-12 is actuated to push the heated sleeve onto the heated tube, the hydraulic cylinder 11 pushes rods 12 which, in turn, push annulus 10 against the sleeve 8 for ejecting the sleeve from the heating chamber of receptacle 4 and onto tube 5.

The working cycle is terminated after the ejector mechanism has been retracted, after the frame carriage 2 has returned to position $a$ (FIG. 2) and after the receptacle 4 has been pivoted up again to receive the next sleeve 8 from store 7. Concurrently to these last operations, centering and holding device 6 releases tube 5, and the tube with applied sleeve 8 is moved along the production line to the socket forming station.

The invention is not limited to the embodiments described above but all changes and modifications thereof not constituting departures from the spirit and scope of the invention are intended to be included.

I claim:

1. Apparatus for applying a sleeve onto a tube, comprising:

a horizontal movable carriage;

means for holding a tube in horizontal disposition, so that the axis of the tube is parallel to a path, along which the carriage can be moved;

a receptacle with heating chamber for heating a sleeve when in the chamber and mounted on the carriage for pivoting on a horizontal axis and assuming a first upright position for receiving a sleeve for heating and a second horizontal position in coaxial alignment with the tube as held by the means for holding, the carriage provided for moving in and parallel to the axis of said tube; and an ejector mechanism on the receptacle and extending into the receptacle for ejecting the sleeve from the receptacle and pushing the sleeve onto the tube when the receptacle has the second disposition.

2. Apparatus as in claim 1, and including a second receptacle with heating chamber, also pivotally mounted on said carriage and in alignment with said tube when held in said horizontal disposition while the heating chamber of the first receptacle is in upright position, for heating the tube end but retracting from the tube for pivoting of the first receptacle into horizontal alignment position of the sleeve in the heating chamber of the first receptacle with the tube.

3. Apparatus as in claim 1, the first receptacle having an annular heating chamber with a central core, defining a mandrel as a tube-end-forming tool and projecting from the receptacle.

4. Apparatus as in claim 2, the two receptacles being mounted to each other and at right angles for pivoting in unison.

5. Apparatus as in claim 1, the heating chamber being annular.

6. Apparatus as in claim 1, there being a feeder device for sleeves above the carriage and in alignment with the receptacle when the receptacle is in the first position.

* * * * *